Nov. 13, 1956 G. J. O'BRIEN 2,770,035
CAKE CUTTER AND SERVER
Filed Feb. 29, 1956
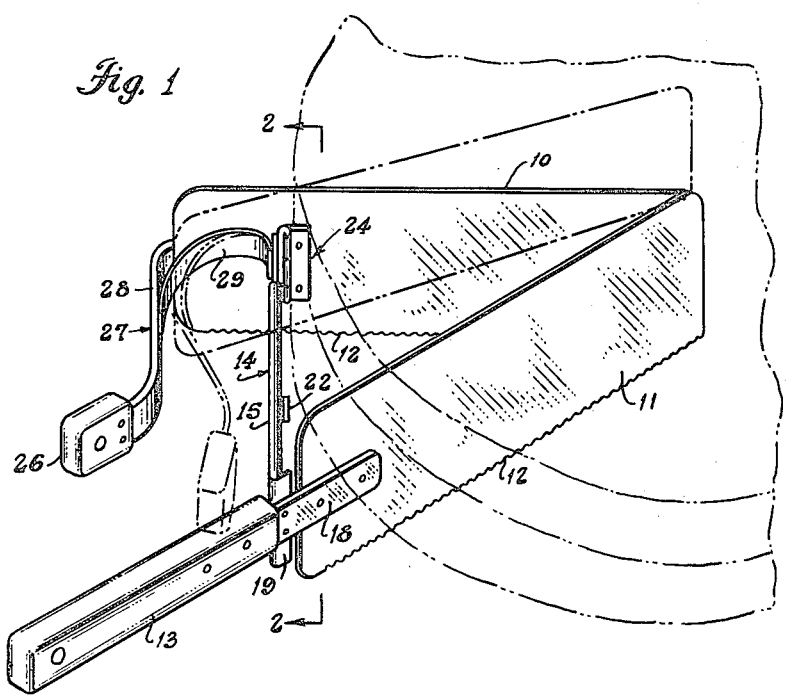
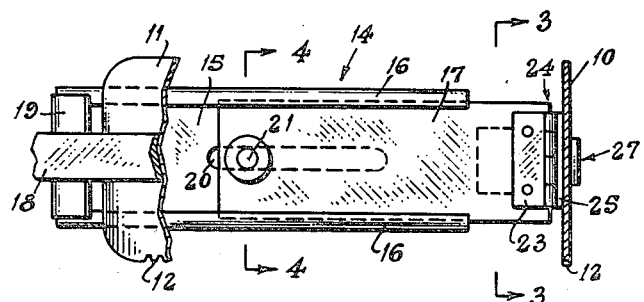
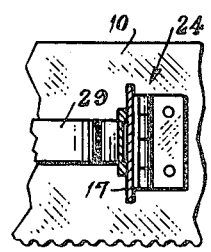
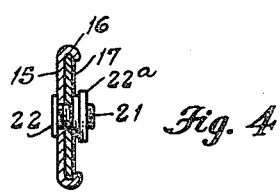
INVENTOR.
G. J. O'BRIEN
BY J. Ledermann
ATTORNEY

United States Patent Office 2,770,035
Patented Nov. 13, 1956

2,770,035

CAKE CUTTER AND SERVER

Gerard J. O'Brien, Jersey City, N. J.

Application February 29, 1956, Serial No. 568,555

3 Claims. (Cl. 30—114)

This invention relates to cake cutters adapted particularly for cutting a sector from a relatively tall cylindrical and soft cake such as, for example, a layer cake, the main object being to provide a combined cake cutter and server for not only cutting the sector from the cake but also for removing it to a plate without damaging or disfiguring the cut sector.

Another object of the invention is the provision of a cake cutter and server having means for readily varying the size or width of the sector of cake to be cut, so that the portions of cake thus cut vary in size as desired.

The above broad as well as additional and more specific objects will be clarified in the following description wherein reference numerals refer to like-numbered parts in the accompanying drawing. It is to be noted that the drawing is intended solely for the purpose of illustration and that it is therefore neither desired nor intended to limit the invention necessarily to any or all of the exact details of construction shown or described except insofar as they may be deemed essential to the invention.

Referring briefly to the drawing, Fig. 1 is a perspective view of a combined cake cutter and server illustrating an embodiment of the features of the present invention and showing, in phantom, a cake to which the implement is applied.

Fig. 2 is a sectional view taken on the line 2—2 of Fig. 1.

Fig. 3 is a sectional view taken on the line 3—3 of Fig. 2.

Fig. 4 is a sectional view taken on the line 4—4 of Fig. 2.

Referring in detail to the drawing, the numerals 10 and 11 indicate the two cutting blades of the implement, which are provided with serrations or teeth 12 of any suitable depth of pitch on their lower edges, the depth or width of the blades being sufficient to approximately equal that of an average layer or fruit cake or the like.

A relatively long handle 13 is secured to and in alignment with the blade 11. At approximately the position of junction of the handle with the blade 11, one end of a telescopically expandable or retractable member or support 14 is secured rigidly and at an angle to the blade 11. This member 14 consists of a base 15 having its opposed longitudinal edges 16 doubled back to provide guides, and a plate 17 is slidably mounted on the base between the guides 16. In the example illustrated, the handle 13 has an extension 18 riveted or otherwise secured to the blade 11, and the base 15 has one end 19 bent at the desired angle and also riveted or otherwise secured, to the handle extension 18. The base 15 has a longitudinal slot 20 in which a screw 21 which passes through an opening in the plate 17, registers; on one end the screw has an enlarged head 22 of greater diameter than the width of the slot. A nut 22a screwed on the other end of the screw is adapted to tighten and lock the base and the plate together in any extended or retracted position of the plate with respect to the base, within the range of the slot 20. In this way the member 14 is adapted to be expanded or retracted longitudinally.

At its other end the base 15 has one ear 23 of a hinge 24 secured thereto on the same side of the base as the plate 17, the other ear 25 of the hinge being secured to the blade 10. The latter is provided with a preferably smaller handle 26 secured to the blade substantially as shown, that is, through the medium of an approximately S-shaped extension 27. The intermediate portion 28 of this extension or arm is normally, that is, when the tips of the blades 10 and 11 are in mutual contact as shown in Fig. 1, substantially parallel to the member 14. In this normal position of the blades, moreover, the handle 26 is substantially parallel to the handle 13, as shown.

A spring is provided normally to urge the blade 10 to swing clockwise, Fig. 1, on the hinge or pivot 24 into the normal position above-mentioned. In the embodiment of this feature illustrated, the spring is in the form of a leaf spring 29 having one end anchored to the back of the plate 17 and the other end frictionally engaging the handle extension 27.

In use, assuming that the implement is held in the right hand, the fingers and palm hold the handle 13 and the thumb engages the outer side of the handle 26. When applied to a cake, the blades are in mutual engagement at their tips, as shown in Fig. 1, because of the spring 29, and the blades are positioned above the cake and urged downward therethrough, in an obvious manner. When the sector of cake has thus been cut free, it is lifted out of the cake and it, together with the implement, is readily turned in the air en route to a plate without danger of breaking or becoming disfigured. The sector is deposited upright on the plate, and by merely exerting pressure between the thumb and the fingers of the hand the blade 10 is swung free of the sector to release both blades so that the sector may be deposited upright and intact on the plate. Thus the implement serves not only to cut a slab or sector out of the cake but also to serve it, that is, deposit it on a plate.

I claim:

1. A cake cutter and server comprising a pair of blades adapted to cut down through a cake, each of said blades having a handle at one end thereof, a telescopic member having one end rigidly secured to one of the blades at the handle end thereof and extending at an angle thereto in the direction of the other of said blades, the other end of said telescopic member being pivotally secured to said other of said blades near the handle end thereof, resilient means normally urging said other of said blades to swing toward said one of said blades to a limit position wherein the other ends of the blades are in mutual contact, and means for locking said telescopic member against expansion or contraction.

2. The device set forth in claim 1, the handle on said one of said blades being elongated and in alignment with said one of said blades, the handle on said other of said blades being substantially shorter than said handle on said one of said blades and having an extension thereon between the same and the other of said blades, said resilient means comprising a normally tensed spring having one end secured to said telescopic member and the other end in engagement with said extension.

3. The device set forth in claim 1, said telescopic member comprising a fixed portion having one end secured to said one of said blades and a movable portion having one end pivoted to said other of said blades.

No references cited.